Nov. 5, 1957     O. V. JONES, JR     2,811,884

STOCK FEEDER

Filed June 21, 1955     2 Sheets-Sheet 2

*INVENTOR.*
OTIS V. JONES JR.
BY
ATTORNEY

United States Patent Office 2,811,884
Patented Nov. 5, 1957

2,811,884
STOCK FEEDER

Otis V. Jones, Jr., Dearborn, Mich., assignor to Acro-Feed Industries, Inc., Detroit, Mich., a corporation of Michigan Application June 21, 1955, Serial No. 516,938

8 Claims. (Cl. 82—2.5)

This invention relates to a stock feeder for multiple spindle screw machines.

At present, certain multiple spindle screw machines must be stopped for reloading each time that the bar stock fed to the machine is used up. This requires a considerable amount of time especially when the machine is cutting stock of relatively great size. When this is the case, any length of bar stock is used within a relatively short period of time and the machine must be frequently stopped for reloading. As a result, the machine requires the constant attention of a workman and its production capacity is limited because of the frequent down time.

This invention provides a stock feeder for reloading a multiple spindle screw machine without having to stop the machine. The invention includes a pair of rollers which are adapted to engage bar stock between them and to feed the stock to a screw machine spindle which is aligned with the rollers. The rollers are disengaged from the stock before the machine indexes to its next position so that they will not interfere with the indexing operation. After the machine has indexed, the rollers are moved into engagement with the stock in the next spindle which has become aligned with the rollers. This operation is repeated each time that the machine indexes.

An object of this invention is to provide a stock feeder for machine tools.

Another object of this invention is to provide a stock feeder for multiple spindle machine tools.

A still further object of this invention is to provide a feeder of the above character for feeding new stock to a multiple spindle screw machine without having to stop the machine each time that the previously fed stock is used up.

Another object is to provide a stock feeder which is relatively simple to construct and which may be easily adapted for use with most types of multiple spindle screw machines.

Other objects and advantages will become apparent from the following detailed description and from the appended drawings and claims.

Figure 1:
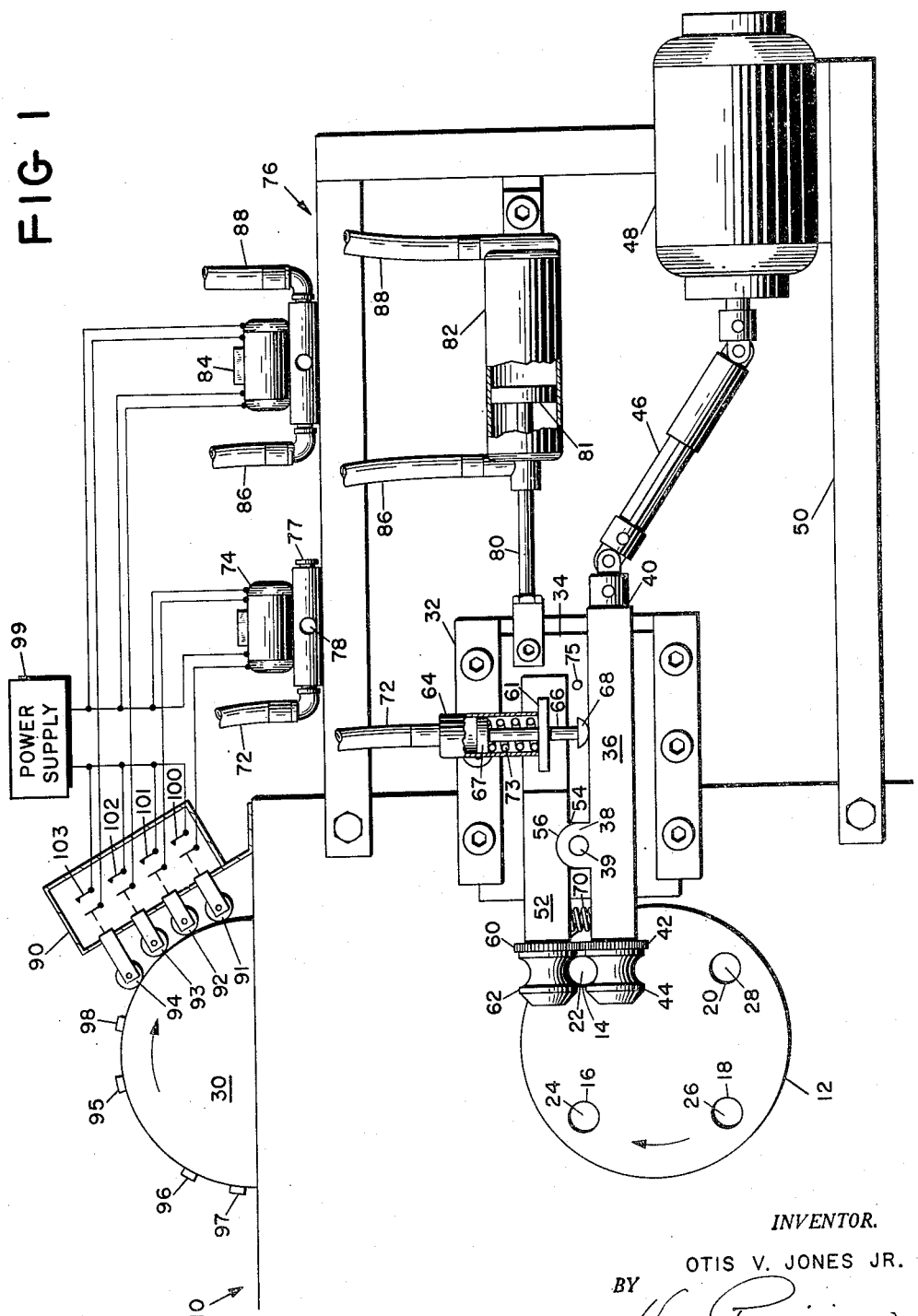
Figure 1 is a side view of a stock feeder shown in engagement with stock being fed to a multiple spindle screw machine.

Generally indicated at 10 is an end view of a multiple spindle screw machine which has a spindle carriage 12. The spindle carriage 12 is provided with a plurality of spindles 14, 16, 18 and 20 which support bars of stock 22, 24, 26 and 28, respectively. A cam drum 30 on the machine 10 operates to move tools (not shown) to cut the stock mounted in the spindles.

A sliding way 32 is securely mounted on the machine tool 10, and a plate 34 is disposed in slidable relationship to the way. A rectangular block 36 is provided with an extended portion 38 which is pivotably supported on the plate 34 by a pin 39 which extends through the portion 38 and is secured to the plate. Extending through the block 36 is a shaft 40 which has a gear 42 and a spool or roller 44 mounted on its left end. Coupled to the right end of the shaft 40 is one end of a telescoping joint 46. The other end of the joint 46 is coupled to the shaft of a motor 48. The motor 48 is supported by frame work 50 which is securely mounted on the machine 10.

Another rectangular block 52 has an extended portion 54 through which the pin 39 also extends to support the block in pivotal relationship to the plate. The block 52 is provided with an indented surface 56 in contact with a complimentary surface on the extended portion 38. A gear 60 and a roller 62 are journalled into the left end of the block 52. When the blocks 52 and 36 are positioned as shown in Figure 1, the gear 60 meshes with the gear 42.

Figure 2:
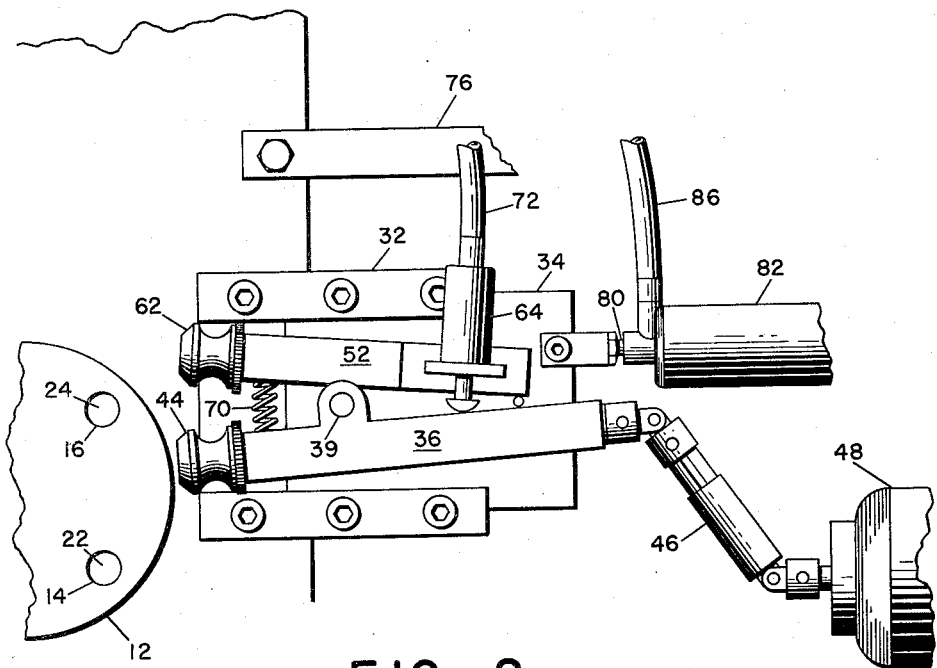
Figure 2 is another side view of the stock feeder in Figure 1 shown disengaged from the stock so that it will not interfere with the indexing operation of the screw machine.

A section of the block 52 is cut away at its right end to provide an extended portion 61 in the block. A piston housing 64 is secured to the portion 61 and a shaft 66 connected to the piston 67 in the housing extends through the portion 61 in slidable relationship to the portion. A rounded cap 68 is screwed on the end of the shaft 66. One end of a flexible air hose 72 is connected to the piston housing 64 for introducing compressed air into the housing so as to force the piston 67 and the shaft 66 in a downward direction. The shaft 66 is shown in its downward position in Figure 1 with the cap 68 pressing against the upper surface of the block 36 for producing an engagement between the gears 42 and 60 and an engagement of the bar stock 22 by the rollers 44 and 62. Upon release of the air pressure in the hose 72, the shaft 66 moves upward because of a spring 73 provided under the piston 67. When the air pressure is released the force of a spring 70 connected between the blocks 36 and 52 causes the blocks to pivot relative to the plate 34 as shown in Figure 2. The pivotal movement is limited by a stop 75 provided on the plate 34. In this position, the gears 42 and 60 are disengaged from each other and the rollers 44 and 62 are displaced from the bar stock.

The opposite end of the hose 72 is connected to a valve 74 for controlling the air pressure introduced to the hose. The valve 74 is mounted on frame work generally indicated at 76 which is supported by the screw machine 10. The valve 74 may be a four way spool type valve which is solenoid operated and has one outlet closed off by a plug 77. Energization of the solenoid in a first direction produces a movement of the spool in the valve for opening certain ports to introduce air pressure to the hose 72 from the output of an air compressor (not shown) which is connected to the supply port 78. When the solenoid in the valve 74 is energized in the opposite direction, the spool in the valve moves to open an exhaust port (not shown) for releasing the air pressure in the hose 72.

Connected to the plate 34 is a shaft 80 extending from a two way piston 81 in a piston housing 82 which is connected to the frame work 76. The opposite ends of the housing 82 are connected to opposite outlet ports of a valve 84 by flexible air hoses 86 and 88, respectively. The valve 84 may be a four way spool type valve similar to the valve 74. When the solenoid in the valve is energized in one direction air pressure is introduced to the housing 82 from the hose 86 so as to drive the piston and the shaft 80 to the right and when the solenoid is energized in the opposite direction, air pressure is introduced from the air hose 88 to drive the piston and the shaft to the left. In this way, the plate 34 which is connected to the shaft 80 may be displaced to the left or to the right as shown in Figures 1 and 2, respectively.

A micro-switch housing 90 is mounted on the machine tool 10. The housing 90 includes four switches 100, 101, 102 and 103 which are operated by the positioning of rotatable discs 91, 92, 93 and 94, respectively. The discs 91, 92, 93 and 94 normally ride on the surface of the drum 30 and are displaced from one another along the axis of the drum. When the discs ride the drum surface, the micro-switches associated with the discs remain open. Provided on the surface of the drum 30 are lugs 95, 96, 97 and 98 which are aligned with the discs 91, 92, 93 and 94, respectively. Whenever a disc strikes its associated lug, the disc is displaced towards the housing 90 to momentarily close the switch associated with the disc.

The switch 100 and the switch 101 are connected in series with a power supply 99 and the left and right solenoid windings in the valve 74. Similarly, the switches 102 and 103 are connected in series with the power supply 99 and with the left and right solenoid windings in the valve 84.

During the operation of the machine 10, the cam drum 30 rotates in the direction shown and makes one revolution between successive indexing operations to move tools to cut the stock in the spindles. When the disc 94 contacts its lug 98, the switch 103 closes to energize the right solenoid winding to cause a displacement of the piston 81 and the shaft 80 to the left as prviously disclosed. This causes the plate 34 to be displaced to the left relative to the way 32 as shown in Figure 1. When the disc 91 contacts its lug 95, the left solenoid winding of the valve 74 is energized to cause the shaft 66 to exert a downward force on the block 36 so as to maintain the rollers 44 and 62 in contact with the bar stock 22 on the spindle 14 as shown in Figure 1.

Figure 3:
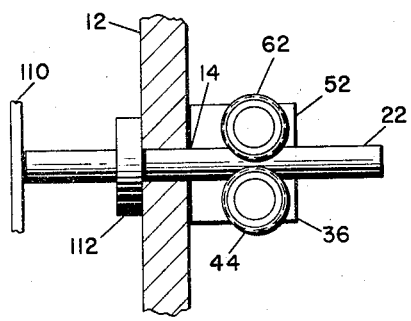
Figure 3 is an end view of the stock feeder shown in Figure 1.

Since the motor 48 is rotating at a constant speed, the gear 42 and the roller 44 are rotated at a constant speed towards the spindle 14. The gear 60 and the roller 62 also rotate towards the spindle 14 because the gear 60 is in mesh with the gear 42. This rotation of the rollers 42 and 44 causes the bar stock 22 to be fed through the spindle 14. As the stock 22 continues to be fed through the spindle 14, the stock reaches a stop 110 (Figure 3) which prevents any further feeding action. As soon as the stop is reached, a collet 112 clamps on the stock 22 and the spindle 14 rotates the stock for the cutting operation.

When the collet 112 becomes clamped on the stock 22, the cam drum 30 has rotated to a position such that the disc 92 contacts its lug 96. This closes the switch 101 to energize the right solenoid winding in the valve 74 so as to cause the release of the air pressure on the piston 67. As a result, the spring 73 moves the piston 67 upward, and the force of the spring 70 causes a pivotal movement of the blocks 36 and 52 to disengage the rollers 44 and 62 from the stock 22 as shown in Figure 2.

The continued rotation of the drum 30 causes the disc 93 to contact its lug 97 to close the switch 102. When this occurs, the piston 81, the shaft 80, and the plate 34 are moved to the right so that the rollers 44 and 62 are displaced from the spindle carriage 12 as shown in Figure 2.

The spindle carriage 12 is now free to go through its indexing operation during which the carriage rotates in a clockwise direction so that the spindle 14 now occupies the position previously occupied by the spindle 20 and the spindle 16 moves into the previous position of the spindle 14.

While the cutting operation progresses on the stock 22, 28 and 26 in the spindles 14, 20 and 18 a piece of finished stock in the spindle 16 is cut off. After the finished stock is cut off, the collet 120 is released and the disc 94 again contacts the lug 98 thus closing the switch 103. This actuates the valve 84 to cause the piston 81 and the shaft 80 to move to the left. Immediately thereafter the disc 91 contacts the lug 95 to close the switch 100. This actuates the valve 74 so as to apply air pressure to the piston 67 to move the shaft 66 against the block 36 so as to pivot the rollers 44 and 62 into engagement with the stock 24. The rollers then rotate in the manner previously disclosed to feed additional length of the stock 24 to the spindle 16. When the stock 24 reaches the stop 110, a collet 120 automatically clamps on the stock. The cycle of operation disclosed above is then repeated.

Figure 4:
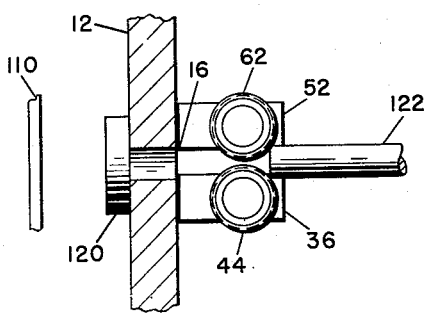
Figure 4 is another end view of the stock feeder.

Whenever any bar stock is used up in a spindle, new stock may be easily fed to the spindle by introducing the stock between the rollers 44 and 62. For example, when the stock 24 in the spindle 16 is used up while the spindle is aligned with the rollers 44 and 62, new stock 122 may be manually introduced between the rollers as shown in Figure 4. New stock may be fed to the spindle without interrupting the continued operation of the machine in any way. New stock may be fed in the same manner to each spindle on the machine.

This invention has several important advantages. Because new stock can be fed to any spindle without stopping the operation of the machine, the stock feeder disclosed is instrumental in practically doubling production in many instances. Since the feeder makes reloading a simple operation at particular intervals when the stock is used up, one man can easily operate a considerable number of such machines. This results in a great reduction in labor costs.

The stock feeding apparatus is simple in construction and reliable in its operation. It may be easily mounted for use on most machines of the multiple spindle type. Furthermore, the use of the feeding apparatus eliminates the need for feed fingers and tubes which are normally provided on the spindles in screw machines to feed the stock.

Although this invention has been disclosed and illustrated with reference to particular applications, the principles involved are susceptible of numerous other applications which will be apparent to persons skilled in the art. The invention is, therefore, to be limited only by the scope of the appended claims.

What is claimed is:

1. A stock feeder for a multiple spindle screw machine, including, first and second rotatable members for receiving stock between them, means for rotating the first and second members to feed the stock to a first spindle aligned with the members to receive the stock, means operative prior to the indexing operation of the machine to move the first and second rotatable members out of engagement with the stock and to subsequently move the members away from the stock to permit the machine to index freely, and means operative after the machine has indexed to move the rotatable members into engagement with the stock in the next spindle which has indexed into the initial position of the first spindle.

2. In combination with a multiple spindle screw machine, first and second rotatable members disposed adjacent to a particular spindle position on the machine and being positioned relative to one another to receive stock between them, means for rotating the members to feed the stock to a spindle in the particular position, and means operative prior to the indexing operation of the and means operative prior to the indexing operation of the machine to move the members out of engagement with the stock and to subsequently move the members away from the stock to permit the machine to index freely.

3. A stock feeder for a multiple spindle screw machine, including, a pair of rotatable members disposed to engage stock between them for feeding the stock to a particular spindle on the machine upon a rotation of the members, and means for moving the members out of engagement with the stock and to a position away from the stock to permit the machine to index freely.

4. A stock feeder for a multiple spindle screw machine, including, a pair of rollers disposed relative to each other to receive stock between them, means for rotating at least one of the rollers to feed the stock to a spindle in a particular position, and means operative prior to the indexing operation of the machine for moving the rollers out of engagement with the stock and for subsequently moving the rollers to a position away from the stock to permit the machine to index freely, and means operative after the machine indexes to move the rollers into engagement with the stock in the next spindle indexed into the particular position.

5. A stock feeder for a multiple spindle screw machine, including, a support member movable relative to the machine, a first roller mounted on the support member in pivotal relationship to the member, a second roller mounted on the support member in pivotal relationship to the member, means for pivoting the first and second rollers into contact with the stock in a first spindle of the screw machine and for maintaining the rollers in contact with the stock, means for rotating the first roller to feed a particular length of stock to the first spindle, and means for pivoting the first and second rollers out of contact with the stock and to subsequently move the support member in a first direction relative to the machine to dispose the rollers at a distance from the stock to permit the machine to index without interference, and means operative after the machine indexes to move the rollers into engagement with the stock in the next spindle indexed into the initial position of the first spindle.

6. A stock feeder for a multiple spindle screw machine, including, a support member, a plate movable relative to the support member, a pair of rotatable members mounted on the plate in pivotal relationship to the plate, the members being normally disposed to engage between them the bar stock in a first spindle of the machine, means for rotating the members to feed the stock through the first spindle, means operative prior to the indexing operation of the machine to pivot the rollers out of engagement with the stock and to subsequently move the plate relative to the support member in a first direction to a position the rotatable members away from the stock to permit the screw machine to index freely, and means operative after the machine has indexed to return the plate to its initial position and to pivot the rollers into engagement with the stock in the next spindle which has indexed into the initial position of the first spindle.

7. A stock feeder for a multiple spindle screw machine having stock mounted in each spindle, including, a first member movable relative to the machine, means on the first member for engaging the stock in a first spindle and for feeding the stock to the spindle, means operative prior to the indexing operation of the machine to move the stock engaging means out of engagement with the stock and to subsequently move the first member in a first direction to position the stock engaging means away from the stock to permit the machine to index freely, and means operative after the machine has indexed to return the first member to its initial position and to subsequently move the stock engaging means into engagement with the stock in the second spindle indexed into the initial position of the first spindle.

8. A stock feeder for a multiple spindle screw machine, including, first and second rollers disposed relative to each other to receive stock between them, means including a motor and a telescoping joint for rotating the first roller to feed stock to a spindle in a particular position, means operative prior to the indexing operation of the machine to move the rollers out of engagement with the stock, and means operative after the rollers move out of engagement with the stock to move the rollers away from the stock upon a displacement of the telescoping joint to permit the machine to index freely.

References Cited in the file of this patent

UNITED STATES PATENTS

| 467,098 | Hartness | Jan. 12, 1892 |
| 561,697 | Claussen | June 9, 1896 |
| 1,696,037 | Hornberger | Dec. 18, 1928 |